(12) United States Patent
Allen

(10) Patent No.: US 6,888,540 B2
(45) Date of Patent: May 3, 2005

(54) AUTOSTEREOSCOPIC DISPLAY DRIVER

(75) Inventor: Richard J. Allen, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 322 days.

(21) Appl. No.: 09/838,852

(22) Filed: Apr. 20, 2001

(65) Prior Publication Data
US 2001/0045951 A1 Nov. 29, 2001

(30) Foreign Application Priority Data
May 3, 2000 (GB) .............................................. 0010685

(51) Int. Cl.$^7$ .............................................. G06T 15/00
(52) U.S. Cl. ...................... 345/419; 345/426; 345/427; 345/581; 345/586
(58) Field of Search ................................ 345/419, 581, 345/422, 426, 427, 586; 382/300

(56) References Cited

U.S. PATENT DOCUMENTS

| | | | | |
|---|---|---|---|---|
| 5,808,792 A | * | 9/1998 | Woodgate et al. | 359/463 |
| 5,856,829 A | * | 1/1999 | Gray et al. | 345/422 |
| 5,953,014 A | | 9/1999 | Wood | 345/422 |
| 6,014,144 A | * | 1/2000 | Nelson et al. | 345/426 |
| 6,023,263 A | * | 2/2000 | Wood | 345/581 |
| 6,442,303 B1 | * | 8/2002 | Meijers et al. | 382/300 |
| 6,630,931 B1 | * | 10/2003 | Trika et al. | 345/419 |

FOREIGN PATENT DOCUMENTS

| | | | |
|---|---|---|---|
| EP | 2196166 | 4/1988 | G09F/9/00 |
| EP | 0791847 | 8/1997 | G02B/27/22 |
| WO | WO9737142 | 12/1997 | H04N/13/00 |

OTHER PUBLICATIONS

Bekaert et al., Viewing in 3D, Mar. 1999, pp. 1–23.*
Halle, Autostereoscopic Displays and Computer Graphics, May 1997, pp. 58–62.*

* cited by examiner

*Primary Examiner*—Kimbinh T. Nguyen
(74) *Attorney, Agent, or Firm*—Gregorgy L. Thorne

(57) ABSTRACT

A method of generating a plurality of images for display of a 3D scene from different viewpoints comprises generating a model of the scene using a homogenous coordinate system which uses first, second and third orthogonal axes and a homogeneity value. A first display image is obtained from a first viewpoint and one or more further display images are obtained by updating the a coordinate value of the first display image using the displacement value and the homogeneity value. The use of the homogeneity value reduces the complexity of the calculations required to obtain the further images by post processing.

8 Claims, 2 Drawing Sheets

AUTOSTEREOSCOPIC DISPLAY DRIVER

The present invention relates to a method and apparatus for generating a plurality of images, and in particular the generation of interlaced images for supply to autostereoscopic display devices. For example, such display devices comprise an array of display pixels arranged in rows and columns, and an array of elongate lenticular elements extending parallel to one another overlying the display pixel array and through which the display pixels are viewed.

Examples of such autostereoscopic display apparatus are described in the paper entitled "3-D Displays for Video telephone Applications" by D. Sheat et al in Eurodisplay 1993 and in GB-A-2196166. In these apparatuses, the display is produced by a matrix display device comprising a matrix LC (liquid crystal) display panel having a row and column array of display elements and acting as a spatial light modulator. Overlying the display are lenticular elements provided by a lenticular sheet, whose lenticles, comprising (semi) cylindrical lens elements, extend in the column direction of the display panel with each lenticle overlying a respective group of two, or more, adjacent columns of display elements and extending parallel with the display element columns. Commonly in such apparatus, the LC matrix display panel is of a conventional form, comprising regularly spaced rows and columns of display elements, as used in other types of display applications, e.g. computer display screens, although other arrangements may be provided.

In an arrangement in which each lenticle is associated with two columns of display elements, the display elements in each column provide a vertical slice of a respective 2D (sub-) image. The lenticular sheet directs these two slices and corresponding slices from the display element columns associated with the other lenticles, to the left and right eyes respectively of a viewer in front of the sheet so that the viewer perceives a single stereoscopic image. In other, multiple view, arrangements, each lenticle is associated with a group of four, or more, adjacent display elements in the row direction. Corresponding columns of display elements in each group are arranged appropriately to provide a vertical slice from a respective 2-D (sub-) image so that as a viewer moves his or her head a series of successive, different, stereoscopic views are perceived creating, for example, a look-around impression.

The generation of an image for display by this type of system requires data to be extracted from the number of views of the scene and to be combined. Conventionally, a graphics card generates the multiple views in turn, for example from a 3D model of the scene, and these views are then each stored in an associated memory buffer within a video card. In order to combine pixels from the multiple views, a processor reads and processes the data from the memory buffers, in order to create a combined view for display.

A known method of generating an image to be displayed of a 3D scene from a known viewpoint involves carrying out a transformation on vertex positions from the 3D scene into vertex positions in a frustum viewing region, using a projection matrix. Transformation into this viewing region alters the perspective to improve realism of the displayed image.

It has also been proposed to produce one or more views using post processing applied to an initial view. Only the initial view has to be fully rendered, and then one or more views from different viewpoints (laterally displaced from the initial viewpoint) can be generated by manipulating the data for the initial view. Such post processing is for example described in WO 97/47142.

The known post-processing operation involves adding an offset to the x-axis of the 3D scene data (rather than recalculating all vertex positions using the new viewpoint), and then applying the projection matrix once more. Alternatively, it is possible to apply the x-axis shift to the image already translated into the viewing region. To do this, the depth value (z-axis) must be used, but the lateral shift varies non-linearly with depth. Either of these post processing methods involves significant computational effort.

Another feature of 3D graphics systems is the ability to map a texture onto an object with a perspective-correct mapping. Where a surface is at an angle to the projection plane, a perspective transformation of a texture map is carried out before applying it to the surface. In order to achieve perspective-correct texture mapping, graphics rendering systems traditionally perform projection calculations using a 4×4 projection matrix. 4×4 matrices are also used also for many other kinds of transformations in the 3D model space.

4×4 matrix transformations depend on the representation of points in the 3D model space using homogenous coordinates, in which a fourth coordinate, w, is added to the traditional three spatial coordinates x, y and z. Two sets of homogenous coordinates are considered to refer to the same point in 3-space if one is a multiple of the other. Thus (x, y, z, w) refers to the same point as (x/w, y/w, z/w, 1) in which representation the fourth coordinate ("1") can be dropped. The process of multiplying through by 1/w (and optionally dropping the last coordinate) is referred to as the process of "homogenizing" the point, after which the representation is referred to as an "homogenized" representation of the point. Similarly, the process of multiplying through by any non-zero and non-unity w value is referred to as the process of "de-homogenizing" the point, after which the representation is referred to herein as "de-homogenized". The term "homogeneity value" as used herein includes both w and 1/w. As will be seen, the homogeneity value for a point is related to its depth in the scene.

Thus the projection calculations traditionally performed naturally yield a homogeneity value ((1/w) or w) for each point projected onto an image plane. Traditional texture mapping, which maps a texture onto a planar polygon of the model, utilizes the homogeneity values as follows.

Initially, each vertex of the model space polygon is assigned, in addition to attribute values and its model space coordinates (x,y,z), a pair of depth-independent coordinates (u,v) into a depth-independent texture space. The texture space is considered herein to be "depth-independent" because it is defined with only two Cartesian coordinates (u and v). For each vertex, homogenized image space coordinates (x/w, y/w) are calculated using homogenous transformations. This calculation yields the homogeneity value 1/w for the vertex, which is applied to the depth-independent texture space coordinates (u,v) for the vertex to generate "depth-adjusted" texture coordinates (u/w, v/w). These can be thought of as coordinates into a "depth-adjusted texture space".

For each pixel of the polygon as projected onto the image plane, in addition to calculating its new image space coordinates by interpolation, the depth-adjusted texture coordinates are also calculated by interpolation. The homogeneity value 1/w is also interpolated for the pixels lying between polygon vertices.

In general, at least for one-point perspective projections onto an image plane perpendicular to the z axis, the homogeneity value produced by the 4×4 matrix calculation is related to the depth coordinate z of the point in model space by a linear relationship of the form:

$$w = \alpha.z + \beta$$

where $\alpha$ and $\beta$ are constants which depend on such variables as the position of the image plane on the z-axis in model space and the chosen center of projection (COP). For projections onto the plane z=d with COP=(0,0,0), it can be shown that w=z/d.

According to the present invention, there is provided a method of generating a plurality of images for display of a 3D scene from different viewpoints, comprising:

generating a model of the scene using a homogenous coordinate system which uses first, second and third orthogonal axes and a homogeneity value;

obtaining a first display image from a first viewpoint by transforming vertex positions from the 3D scene into vertex positions in a frustum viewing region using a projection matrix, the projection matrix having terms derived from the position of the viewpoint relative to the frustum viewing region; and obtaining one or more further display images from one or more further viewpoints aligned along the first axis with the first viewpoint and displaced from the first viewpoint by a multiple of a displacement value, by updating the first axis value of the first display image using the displacement value and the homogeneity value.

The use of the homogeneity value reduces the complexity of the calculations required to obtain the further images by post processing. Preferably, texture and lighting conditions are applied when creating the first image, and these conditions are not altered when creating the additional images. The homogeneity value is preferably inversely proportional to a depth value measured along the third orthogonal axis, and is used for interpolation of texture values. Thus, no additional processing is required to obtain the homogeneity value suitable for use in scaling the x-axis of display images during post-processing.

The first image and the one or more further images are preferably combined to form an interleaved image for supply to an autostereoscopic display device.

The one or more further images are preferably obtained by a graphics processing device without further use of the 3D scene data. This reduces the bandwidth required for communication between the memory or processor where the 3D scene data is stored, and the graphics processing device. This enables the generation of a combined autostereoscopic image to be performed more efficiently and rapidly, improving real-time image generation.

The invention also provides an apparatus for generating a plurality of images of a 3D scene from different viewpoints, comprising:

a memory device storing a model of the scene using a homogenous coordinate system which uses first, second and third orthogonal axes and a homogeneity value;

a graphics processor for transforming vertex positions from the 3D scene into vertex positions in a frustum viewing region to define a first image in the viewing region, the graphics processor deriving a projection matrix in dependence on the position of the viewpoint relative to the frustum viewing region, the projection matrix being used to translate image coordinates from the 3D scene into the viewing region;

wherein the graphics processor further comprises means for generating one or more further images from one or more further viewpoints aligned along the first axis with the first viewpoint and displaced from the first viewpoint by a multiple of a displacement value, by updating the first axis value of the first image in the viewing region using the displacement value and the homogeneity value.

This apparatus is preferably used in an autostereoscopic display device.

An example of the invention will now be described in detail with reference to and as shown in the accompanying drawings in which.

Figure 1:
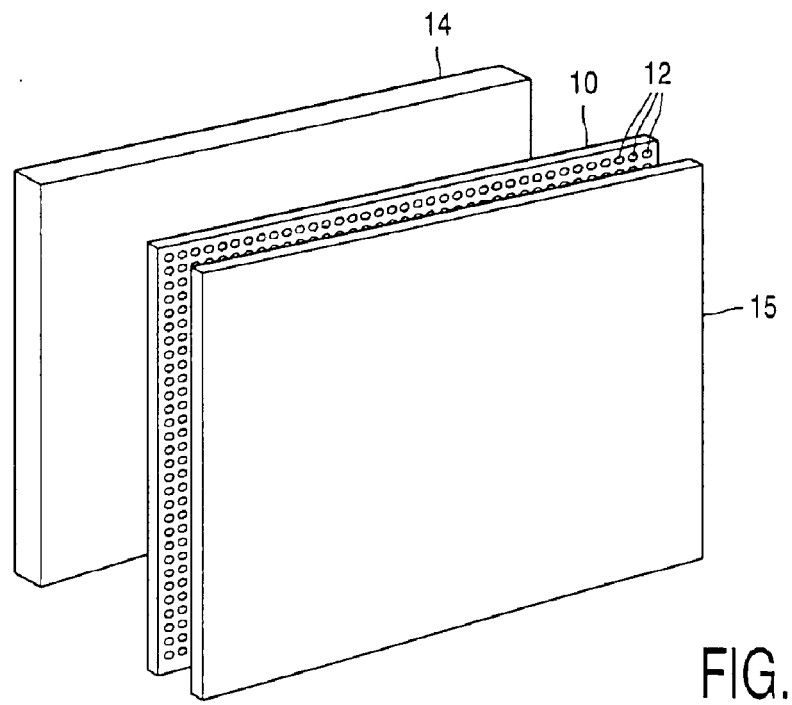
FIG. 1 is a schematic perspective view of an embodiment of autostereoscopic display apparatus.

In the following example, a direct-view type of 3D-LCD lenticular array display apparatus having a slanted arrangement of lenticules will be initially described with reference to FIGS. 1 and 2, in order to illustrate a suitable host system for the present invention. A more detailed description of this apparatus, together with a number of modifications and variations thereto, is given in the commonly-assigned European patent application number EP-A-0791847 (published 27 Aug. 1997 with an earliest priority date of 23 Feb. 1996) the disclosure of which is herein incorporated by reference.

It will be understood that the Figures are merely schematic and are not drawn to scale. For clarity of illustration, certain dimensions may have been exaggerated whilst other dimensions may have been reduced. Also, where appropriate, the same reference numerals and letters are used throughout the Figures to indicate the same parts and dimensions.

Figure 2:
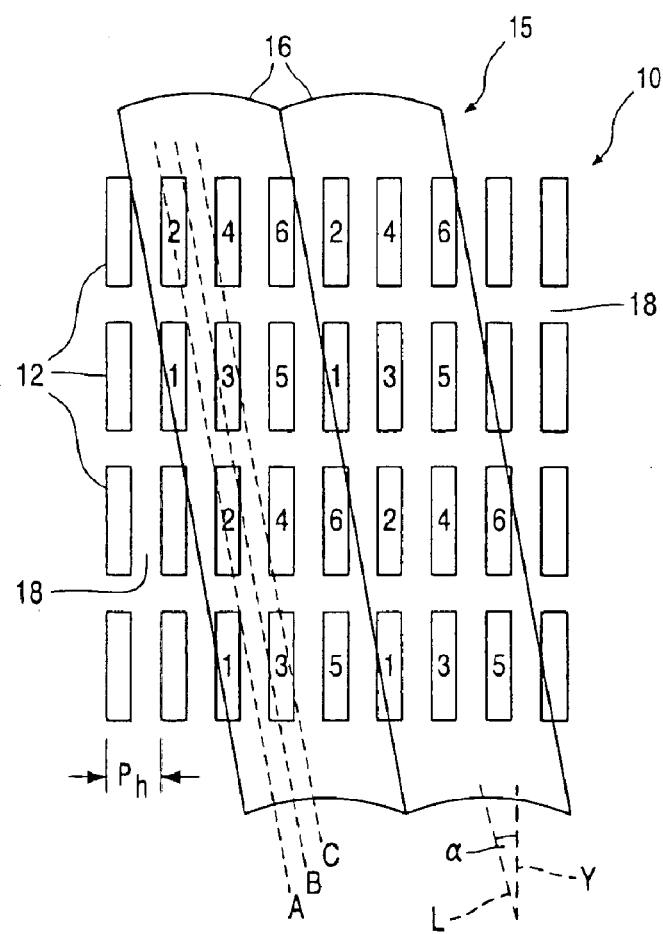
FIG. 2 is a schematic plan view of a part of the display element array of the display panel of FIG. 1, providing a six view output.

Referring to FIG. 1, the display apparatus includes a conventional LC matrix display panel 10 used as a spatial light modulator and comprising a planar array of individually addressable and similarly sized display elements 12 arranged in aligned rows and columns perpendicularly to one another. Whilst only a few display elements are shown, there may in practice be around 800 columns (or 2400 columns if colour, with RGB triplets used to provide a full colour display) and 600 rows of display elements. Such panels are well known and will not be described here in detail.

The display elements 12 are substantially rectangular in shape and are regularly spaced from one another with the display elements in two adjacent columns being separated by a gap extending in the column (vertical) direction and with the display elements in two adjacent rows being separated by a gap extending in the row (horizontal) direction. The panel 10 is of the active matrix type in which each display element is associated with a switching element, comprising for, example, a thin film transistor, TFT or a thin film diode, TFD, situated adjacent the display element.

The display panel 10 is illuminated by a light source 14 which, in this example, comprises a planar back-light extending over the area of the display element array. Light from the source 14 is directed through the panel with the individual display elements being driven, by appropriate application of drive voltages, to modulate this light in conventional manner to produce a display output. The array of display pixels constituting the display produced thus corresponds with the display element array, each display element providing a respective display pixel.

Over the output side of the panel 10, opposite that facing the light source, there is disposed a lenticular sheet 15 comprising an array of elongate, parallel, lenticles, or lens elements, acting as optical director means to provide separate images to a viewer's eyes, producing a stereoscopic display to a viewer facing the side of the sheet 15 remote from the panel 10. The lenticles 16 of the sheet 15, which is of conventional form, comprise optically cylindrically converging lenticles, for example formed as convex cylindrical lenses or graded refractive index cylindrical lenses. Autostereoscopic display apparatus using such lenticular sheets in conjunction with matrix display panels are well known in the art. The lenticles in the apparatus of FIG. 1 are arranged slanted with respect to the columns of display pixels, that is, their main longitudinal axis is at an angle to the column direction of the display element array. This arrangement has been found to provide a number of benefits in terms of reduced resolution loss and enhanced masking of the black area between display elements, as is described in the above-referenced application number EP-A-0791 847.

The pitch of the lenticles is chosen in relation to the pitch of the display elements in the horizontal direction according to the number of views required, as will be described. Each lenticle, apart from those at the sides of the display element array, extends from top to bottom of the display element array. FIG. 2 illustrates an example arrangement of the lenticles in combination with the display panel for a typical part of the display panel. The longitudinal axis of the lenticles, L, is slanted at an angle $\alpha$ to the column direction Y. In this example, the spacing between the longitudinal axes of the parallel lenticles is of such a width with respect to the pitch of the display elements in a row, and slanted at such an angle with respect to the columns of display elements, as to provide a six view system. The display elements 12 are numbered (1 to 6) according to the view-number to which they belong. The individual, and substantially identical, lenticles 16 of the lenticular sheet 15 each have a width which corresponds approximately to three adjacent display elements in a row, i.e. the width of three display elements and three intervening gaps. Display elements of the six views are thus situated in groups comprising display elements from two adjacent rows, with three elements in each row.

The individually operable display elements are driven by the application of display information in such a manner that a narrow slice of a 2D image is displayed by selected display elements under a lenticle. The display produced by the panel comprises six interleaved 2D sub-images constituted by the outputs from respective display elements. Each lenticle 16 provides six output beams from the underlying display elements with view-numbers 1 to 6 respectively whose optical axes are in mutually different directions and angularly spread around the longitudinal axis of the lenticle. With the appropriate 2D image information applied to the display elements and with a viewer's eyes being at the appropriate distance to receive different ones of the output beams then a 3D image is perceived. As the viewer's head moves in the horizontal (row) direction then a number of stereoscopic images can be viewed in succession. Thus, a viewer's two eyes would see respectively, for example, an image composed of all display elements "1" and an image composed of all display elements "2". As the viewer's head moves, images comprised of all display elements "3" and all display elements "4" will be seen by respective eyes, then images comprised of all display elements "3" and all display elements "5", and so on. At another viewing distance, closer to the panel, the viewer may, for example, see views "1" and "2" together with one eye and views "3" and "4" together with the other eye.

The plane of the display elements 12 coincides with the focal plane of the lenticles 16, the lenticles being suitably designed and spaced for this purpose, and consequently position within the display element plane corresponds to viewing angle. Hence all points on the dashed line A in FIG. 2 are seen simultaneously by a viewer under one specific horizontal (row direction) viewing angle as are all points on the dashed line B in FIG. 2 from a different viewing angle. Line A represents a (monocular) viewing position in which only display elements from view "2" can be seen. Line B represents a (monocular) viewing position in which display elements from both view "2" and view "3" can be seen together. Line C in turn represents a position in which only display elements from view "3" can be seen. Thus, as the viewer's head moves, with one eye closed, from the position corresponding to line A to line B and then line C a gradual change-over from view "2" to view "3" is experienced.

The slanting lenticle arrangement can be applied to both monochrome and colour displays.

Figure 3:
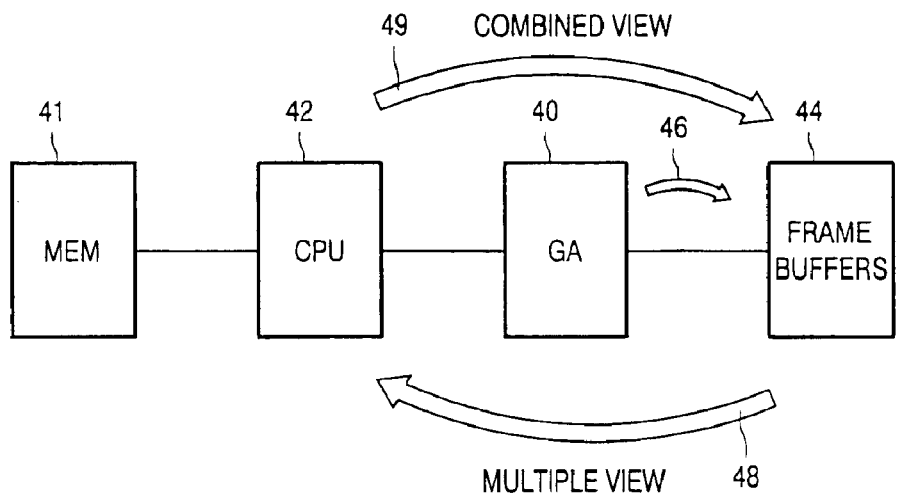
FIG. 3 is a schematic diagram for explaining a known hardware configuration for generating a combined image.

FIG. 3 shows a known system for combining data from multiple views. A graphics accelerator 40 generates (i.e. renders) the multiple views, for example from a 3D model of the scene stored in the memory 41 associated with the processor 42. The multiple views are rendered in turn, and are then each stored in an associated video memory buffer 44, for example within a video card. This is illustrated as arrow 46. Each video buffer stores image as well as depth information, and for this purpose separate image and depth buffers may be provided.

In order to combine pixels from the multiple views, which are stored in full in allocated buffers, the processor 42 reads and processes the data from the memory buffers (arrow 48) and then sends the combined view for display to a further memory buffer (arrow 49). This may be performed on a pixel by pixel basis, or on a frame by frame basis. This process requires transfer of large quantities of data between the video card with the memory buffers, and the processor, and requires transfer of data in both directions. The bandwidth of the interfaces between the processor and the graphics card limits the speed at which this data transfer can take place, and the combination of multiple views can dramatically reduce the system speed performance.

A digital to analogue converter prepares the digital data stored in the combined image buffer for transmission to the display, and generates the sync pulses required by the display device.

Figure 4:
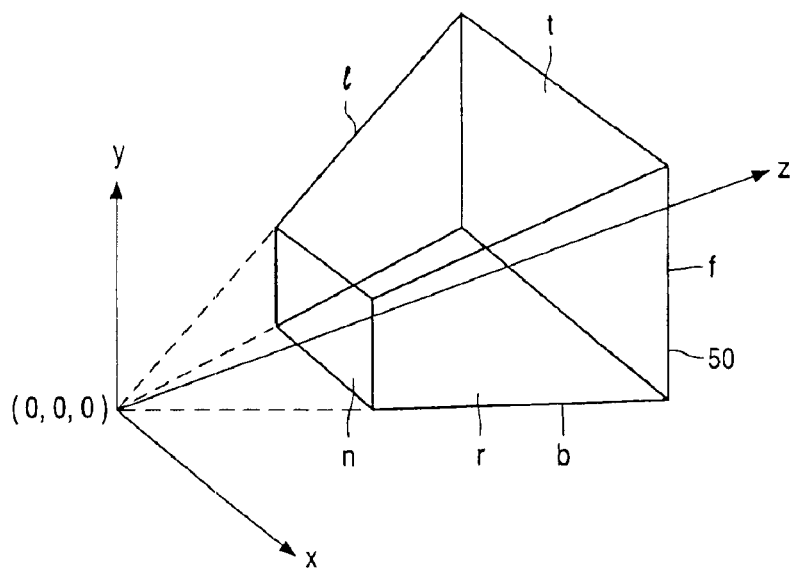
FIG. 4 shows the viewing frustum into which vertices from a 3D model are transformed to derive the image to be displayed.

The images stored in the frame buffers are obtained by calculating which parts of the 3D scene are in view from the particular viewpoint. A known technique for obtaining 2D screen coordinates from a 3D scene translates the 3D scene positions into a so-called viewing frustum, which is shown in FIG. 4. An example of one graphics processing package using this approach is OpenGL.

Once the vertex points have been translated into the frustum viewing region, the particular parts of the image to be displayed are determined by comparing the depth (or homogeneity) values for all pixels and selecting for display the pixels nearest the viewpoint.

The viewing frustum is defined by near and far clip planes (n,f), top and bottom clip planes (t,b) and left and right clip planes (l,r).

Initially, the features making up a scene may be stored as individual 3D models, and these models may be combined to create the overall scene in a coordinate system relative to the viewpoint (the eye). Matrix transformations are applied to the individual models to create the total 3D image. The vertices are identified in the homogenous coordinate system. This complete image is then translated into the viewing frustum using a projection matrix, having terms derived from the position of the viewpoint relative to the frustum viewing region.

The projection matrix typically used, for example in OpenGL, is as follows:

$$M0 = \begin{vmatrix} \frac{2n}{r-1} & 0 & \frac{r+1}{r-1} & 0 \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{vmatrix}$$

wherein distances from the viewing location are defined as follows:
distance to the near clip plane=n
distance to the far clip plane=f
top clip plane=t
bottom clip plane=b
left clip plane=l
right clip plane=r.

Scale factors and translations may be applied to the matrix before the final projection matrix is defined, which is used to translate into the viewing frustum.

The invention makes use of the homogeneity value, particularly 1/w, which is already calculated for all vertices (and interpolated for all other pixels) to update the image in the viewing frustum to provide a post-processing method of generating multiple views, for example which are suitable for an autostereoscopic display. This value 1/w is already used to perform perspective-correct interpolation of textures.

The required offset along the x-axis is shown below to be a simple multiple of the homogeneity value (1/w) and the displacement of the viewpoint. Thus, for a point (x,y,z) in the first image, the position of that point in an image from a viewpoint displaced by dx is (x+k.dx/w, y, z), where k is a constant for the full image.

Figure 5:
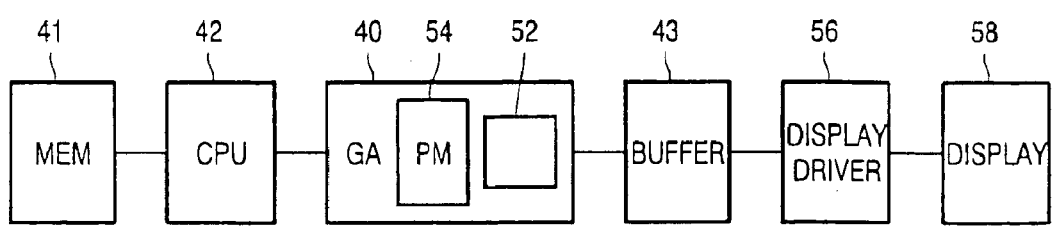
FIG. 5 is a block schematic diagram illustrating components of a display driver apparatus embodying the invention.

FIG. 5 shows an example of the system of the invention. The graphics accelerator 40 generates a single view of the scene from a first viewpoint. The graphics accelerator further comprises means 52 for generating one or more further images from one or more further viewpoints aligned along the first axis with the first viewpoint and displaced from the first viewpoint by a multiple of a displacement value. To do this, the x-axis value of the first image is updated using the displacement value and the homogeneity value. The graphics accelerator also includes means 54 for generating the projection matrix for the first image.

A combined image is written in the buffer 43 and is again provided to a digital to analogue converter which is controlled to derive the display drive controls in known manner. The combination may be performed by the CPU or by the graphics accelerator. In either case, the amount of data transfer from the CPU to the graphics accelerator is reduced. The D/A converter may form part of a display driver 56 for driving the display 58 (as shown), or else it may be integrated into the graphics card or the CPU.

The transformation required between views will now be explained in further detail. A sideways displacement a distance dx for the next viewpoint can be represented as a multiplication of the projection matrix M0 (above) by:

$$\begin{vmatrix} 1 & 0 & 0 & dx \\ 0 & 1 & 0 & 0 \\ 0 & 0 & 1 & 0 \\ 0 & 0 & 0 & 1 \end{vmatrix}$$

this gives:

$$M1 = \begin{vmatrix} \frac{2n}{r-1} & 0 & \frac{r+1}{r-1} & \frac{dx \cdot 2n}{r-1} \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{vmatrix}$$

As mentioned above, translations and scalings may also be implemented, and in OpenGL this is achieved with a so-called viewport transformation:

$$\begin{vmatrix} Sx & 0 & 0 & Tx \\ 0 & Sy & 0 & Ty \\ 0 & 0 & Sz & Tz \\ 0 & 0 & 0 & 1 \end{vmatrix}$$

Where Sx, Sy, Sz are scale factors for the image, and Tx, Ty, Tz are the translations of the origin.

This gives:

$$M2 = \begin{vmatrix} \frac{Sx \cdot 2n}{r-1} & 0 & \frac{Sx \cdot (r+1)}{r-1} - Tx & \frac{Sx \cdot dx \cdot 2n}{r-1} \\ 0 & \frac{Sy \cdot 2n}{t-b} & \frac{Sy \cdot (t+b)}{t-b} - Ty & 0 \\ 0 & 0 & \frac{Sz \cdot -(f+n)}{f-n} - Tz & \frac{-2fn \cdot Sz}{f-n} \\ 0 & 0 & -1 & 0 \end{vmatrix}$$

Applying this to the arbitrary vertex:

$$\begin{vmatrix} X \\ Y \\ Z \\ 1 \end{vmatrix}$$

Gives a transformed vertex of:

$$\begin{vmatrix} \frac{X \cdot Sx \cdot 2n}{r-1} + \frac{Z(Sx \cdot (r+1) - Tx)}{r-1} + \frac{Sx \cdot dx \cdot 2n}{r-1} \\ \frac{Y \cdot Sy \cdot 2n}{t-b} + \frac{Z(Sy \cdot (t+b) - Ty)}{t-b} \\ \frac{Sz \cdot -2fn}{(f-n)} + \frac{Z(Sz \cdot -f+n-Tz)}{f-n} \\ -Z \end{vmatrix}$$

This is identical to the standard case except that the last term of the X coordinate has been added. Dividing through by −Z to obtain a unit value of w, the translated x coordinate is:

$$x = \frac{X \cdot Sx \cdot 2n}{-Z \cdot (r-1)} - \frac{(Sx \cdot (r+1) - Tx)}{r-1} + \frac{Sx \cdot dx \cdot 2n}{-Z \cdot (r-1)}$$

The division to obtain a unit value of w provides the real pixel position.

It is apparent from the transformed matrix M2 above that w=−Z. The last term of the translated x coordinate is the only term influenced by the shift of dx in viewing location, and represents the change needed to the image obtained for the original viewing location. Thus, the coordinate values needed for the translated point, in relation to the original coordinate values, can be expressed as (x+k.dx.1/w, y, z).

From reading the present disclosure, other modifications and variations will be apparent to persons skilled in the art. Such modifications and variations may involve equivalent features and other features which are already known in the art and which may be used instead of or in addition to features already disclosed herein.

While the matrix display panel in the above described embodiments comprises an LC display panel, it is envisaged that other kinds of electro-optical spatial light modulators and flat panel display devices, such as electroluminescent or plasma display panels, could be used.

What is claimed is:

1. A method of generating a plurality of images for display of a 3D scene from different viewpoints, comprising:
    generating a model of the scone using a homogenous coordinate system which uses first, second and third orthogonal axes and a homogeneity value (w);
    obtaining a first display image from a first viewpoint by transforming vertex positions from the 3D scene into vertex positions in a frustum viewing region using a projection matrix, the projection matrix having terms derived from the position of the viewpoint relative to the frustum viewing region; and
    obtaining one or more further display images from one or more further viewpoints aligned along the first axis with the first viewpoint and displaced from the first viewpoint by a multiple of a displacement value (dx), by updating the first axis value of the first display image by an amount substantially equal to k*dx/w, where k is a constant for each of the one or more further display images.

2. A method as claimed in claim 1, wherein texture and lighting conditions are applied when creating the first image.

3. A method as claimed in claim 2, wherein the homogeneity value is inversely proportional to a depth value measured along the third orthogonal axis, and is used for interpolation of texture values.

4. A method as claimed in claim 1, wherein the first image and the one or more further images are combined to form an interleaved image for supply to an autostereoscopic display device.

5. A method as claimed in claim 1, wherein the one or more further images are obtained by a graphics processing device without further use of the 3D scene data.

6. Apparatus for generating a plurality of images of a 3D scene from different viewpoints, comprising:
    a memory device storing a model of the scene using a homogenous coordinate system which uses first, second and third orthogonal axes and a homogeneity value (w);
    a graphics processor for transforming vertex positions from the 3D scene into vertex positions in a frustum viewing region to define a first image in the viewing region, the graphics processor deriving a projection matrix in dependence on the position of the viewpoint relative to the frustum viewing region, the projection matrix being used to translate image coordinates from the 3D scene into the viewing region;
    wherein the graphics processor further comprises means for generating one or more further images from one or more further viewpoints aligned along the first axis with the first viewpoint and displaced from the first viewpoint by a multiple of a displacement value (dx), by updating the first axis value of the first image in the viewing region by an amount substantially equal to k*dx/w, where k is a constant for each of the one or more further display images.

7. Apparatus as claimed in claim 6, wherein the graphics processor comprises a graphics acceleration board.

8. An autostereoscopic display device comprising a display panel and a apparatus as claimed in claim 6, for generating multiple images used to drive the display panel as an autostereoscopic display.

* * * * *